(12) United States Patent
Tseng

(10) Patent No.: US 6,321,640 B1
(45) Date of Patent: Nov. 27, 2001

(54) PORTABLE BRAZIER FOR COOKING FOODSTUFFS

(75) Inventor: Chuen-Jong Tseng, Chiayi Hsien (TW)

(73) Assignee: Shin Yeh Enterprise Co., Ltd., Chiayi Hsien (TW)

( * ) Notice: Subject to any disclaimer, the term of this patent is extended or adjusted under 35 U.S.C. 154(b) by 0 days.

(21) Appl. No.: 09/716,608

(22) Filed: Nov. 20, 2000

(51) Int. Cl.⁷ .............. A47J 37/00; A47J 37/04; A47J 37/06; A47J 37/07
(52) U.S. Cl. ............... 99/340; 99/449; 99/450; 99/482; 126/9 R; 126/25 R
(58) Field of Search ............. 99/339, 340, 400, 99/401, 444–450, 481, 482; 126/9 R, 25 R, 41 R, 30, 40, 43, 44

(56) References Cited

U.S. PATENT DOCUMENTS

| | | | | |
|---|---|---|---|---|
| 1,002,716 | * | 9/1911 | Lowrie | 126/9 R |
| 2,057,373 | * | 10/1936 | Dukes | 99/340 X |
| 2,102,217 | * | 12/1937 | Polhemus | 126/25 R |
| 2,161,669 | * | 9/1939 | Freeman | 126/25 R |
| 3,581,731 | * | 6/1971 | Schulze | 126/25 R |
| 5,070,857 | * | 12/1991 | Sarten | 126/25 R |
| 5,097,759 | * | 3/1992 | Vilgrain et al. | 99/449 X |
| 5,123,337 | * | 6/1992 | Vilgrain et al. | 99/340 X |
| 5,575,198 | * | 11/1996 | Lowery | 99/446 X |
| 5,741,536 | * | 4/1998 | Mauer et al. | 426/281 X |
| 5,767,487 | * | 6/1998 | Tippmann | 99/450 X |
| 6,058,830 | * | 5/2000 | Bourgeois | 99/340 |
| 6,089,145 | * | 7/2000 | Watson | 99/339 |

* cited by examiner

Primary Examiner—Timothy F. Simone
(74) Attorney, Agent, or Firm—Ladas & Parry

(57) ABSTRACT

A portable brazier includes a support frame with an accommodating space for accommodating a source of heat, such as charcoal, a perforated surrounding member which is mounted perimetrically on an upper peripheral edge of the support frame and which confines a roasting space, and a lid member which is mounted on the perforated surrounding member to cover the roasting space. The perforated surrounding member has an access hole to provide access to the roasting space. By virtue of the perforated surrounding member, the portable brazier can permit cooking of foodstuffs and can serve as a heater.

13 Claims, 5 Drawing Sheets

PORTABLE BRAZIER FOR COOKING FOODSTUFFS

BACKGROUND OF THE INVENTION

1. Field of the Invention

This invention relates to a portable brazier for cooking foodstuffs, more particularly to a portable brazier with a perforated surrounding member for cooking foodstuffs and for serving as a heater.

2. Description of the Related Art

Referring to FIG. 1, a conventional barbecue grill device 1 is shown to include a tray 11 which has a base wall 111 and a surrounding wall 112 extending upwardly from the base wall 111, and a pair of support legs 12 which are mounted on the base wall ill to lift the tray 11 from the ground. A plurality of through holes 114,115 are formed in the surrounding wall 112 and the base wall 111. A grill member (not shown) can be displaced on an upper peripheral edge 113 of the surrounding wall 112 for placing foodstuffs. Ash due to burnt charcoal drops off from the through holes 115 to the ground, thereby resulting in inconvenience during cleaning the barbecue grill device 1. In addition, the conventional barbecue grill device 1 is monotonous in function and can not be used as a heater due to its lack of a protecting device for the user.

SUMMARY OF THE INVENTION

The object of the present invention is to provide a portable brazier which can cook foodstuffs and serve as a heater.

Another object of the present invention is to provide a portable brazier which is detachable and foldable for facilitating storage and transport.

According to this invention, the portable brazier includes a support frame which has a base wall, a surrounding wall that ex:ends upwardly from a periphery of the base wall to confine an accommodating space for accommodating a source of heat, such as charcoal, and a leg member that extends downwardly from the base wall. The surrounding wall has an upper peripheral edge distal to the leg member in a longitudinal direction. A first grill member is fitted to an inner wall surface of the surrounding wall, and divides the accommodating space into upper and lower chambers. A perforated surrounding member confines a roasting space therein, and has a lower peripheral end which abuts against the upper peripheral edge so as to communicate the roasting space with the upper chamber, an upper peripheral end which is disposed opposite to the lower peripheral end in the longitudinal direction, and an intermediate surrounding portion that is perforated and that extends perimetrically in the longitudinal direction between the upper and lower peripheral ends. The intermediate surrounding portion defines an access hole to provide access to the roasting space. A lid member is mounted on the perforated surrounding member, and has a lower peripheral edge which abuts against the upper peripheral end of the perforated surrounding wall to cover the roasting space. A second grill member can be mounted in the roasting space, while a third grill member can be mounted on the upper peripheral end of the perforated surrounding member for placing foodstuffs. In addition; the portable brazier can serve as a heater and can offer protection to the user by virtue of the perforated surrounding member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
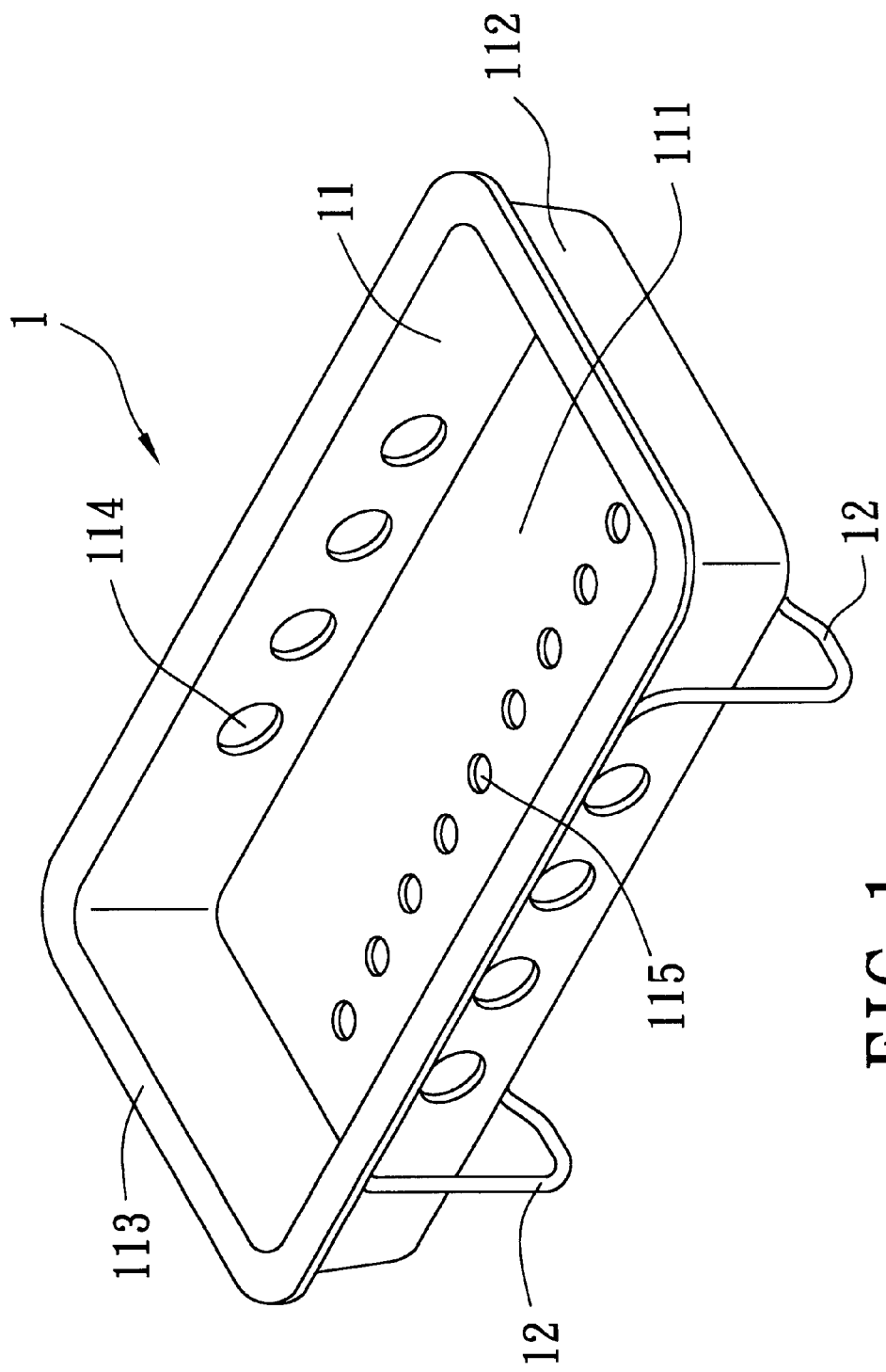
FIG. 1 is a perspective view of a conventional barbecue grill device.
Figure 2:
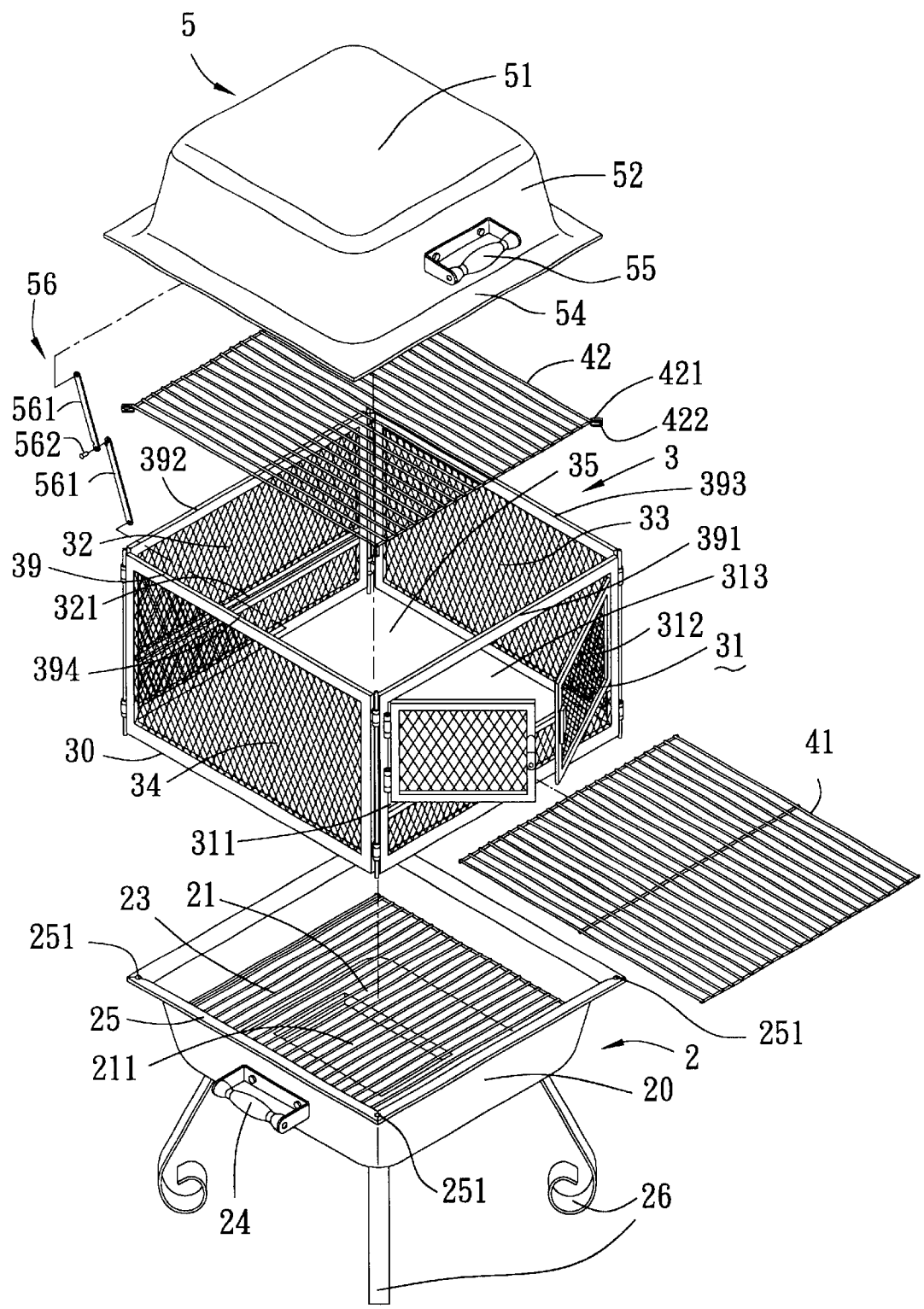
FIG. 2 is an exploded perspective view of a preferred embodiment of a portable brazier according to this invention.
Figure 3:
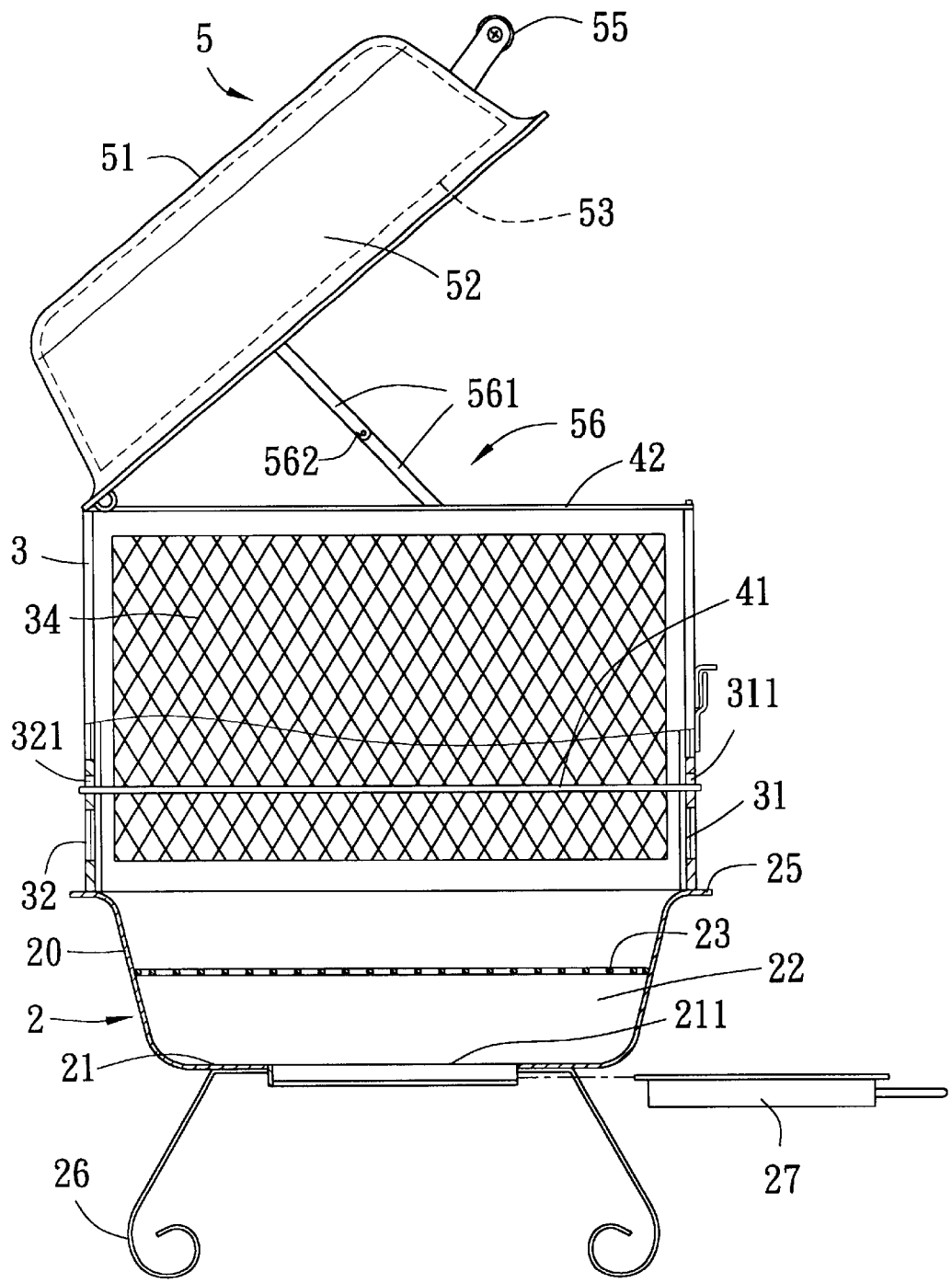
FIG. 3 is a partly sectional side view of the preferred embodiment.
Figure 4:
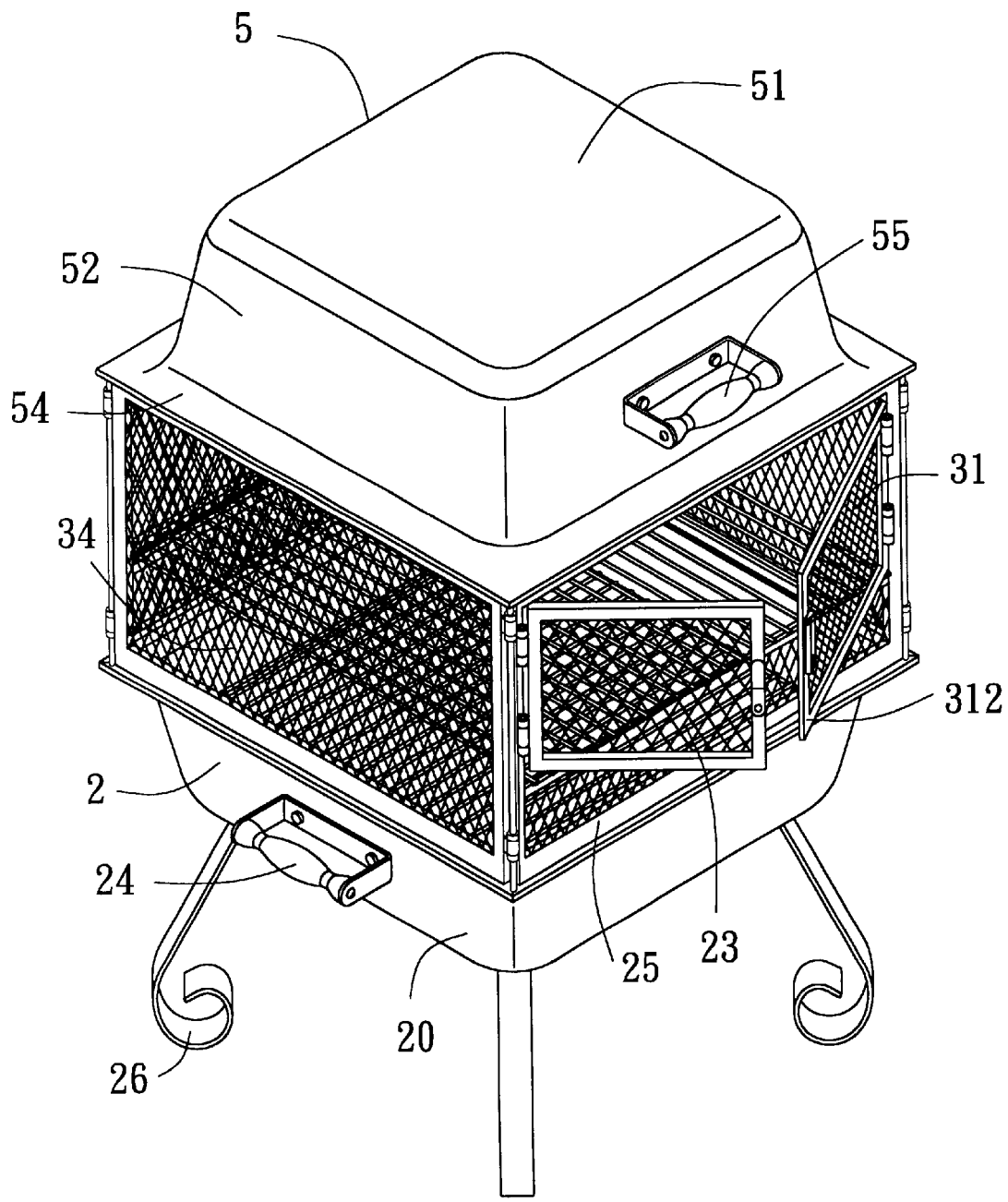
FIG. 4 is a perspective,view of the preferred embodiment.

Referring to FIGS. 2, 3 and 4, the preferred embodiment of the portable brazier according to the present invention is shown to comprise a support frame 2, a perforated surrounding member 3, and a lid member 5.

The support frame 2 includes a base wall 21 which is formed with an ash outlet 211, a surrounding wall 20 which extends upwardly from a periphery of the base wall 21 to confine an accommodating space 22, and a leg member 26 which extends downwardly from the base wall 21. The surrounding wall 20 has an upper peripheral edge 25 distal to the leg member 21 in a longitudinal direction. The upper peripheral edge 25 is formed with four insert holes 251 at four corners thereof. A first grill member 23 is fitted to an inner wall surface of the surrounding wall 21, and divides the accommodating space 22 into an upper chamber for accommodating a source of heat, such as charcoal, and a lower chamber in which ash due to burnt charcoal can drop and can be collected by an ash pan 27 that is disposed under the ash outlet 211. In addition, a pair of opposite handles 24 are disposed on the surrounding wall 20.

Figure 5:
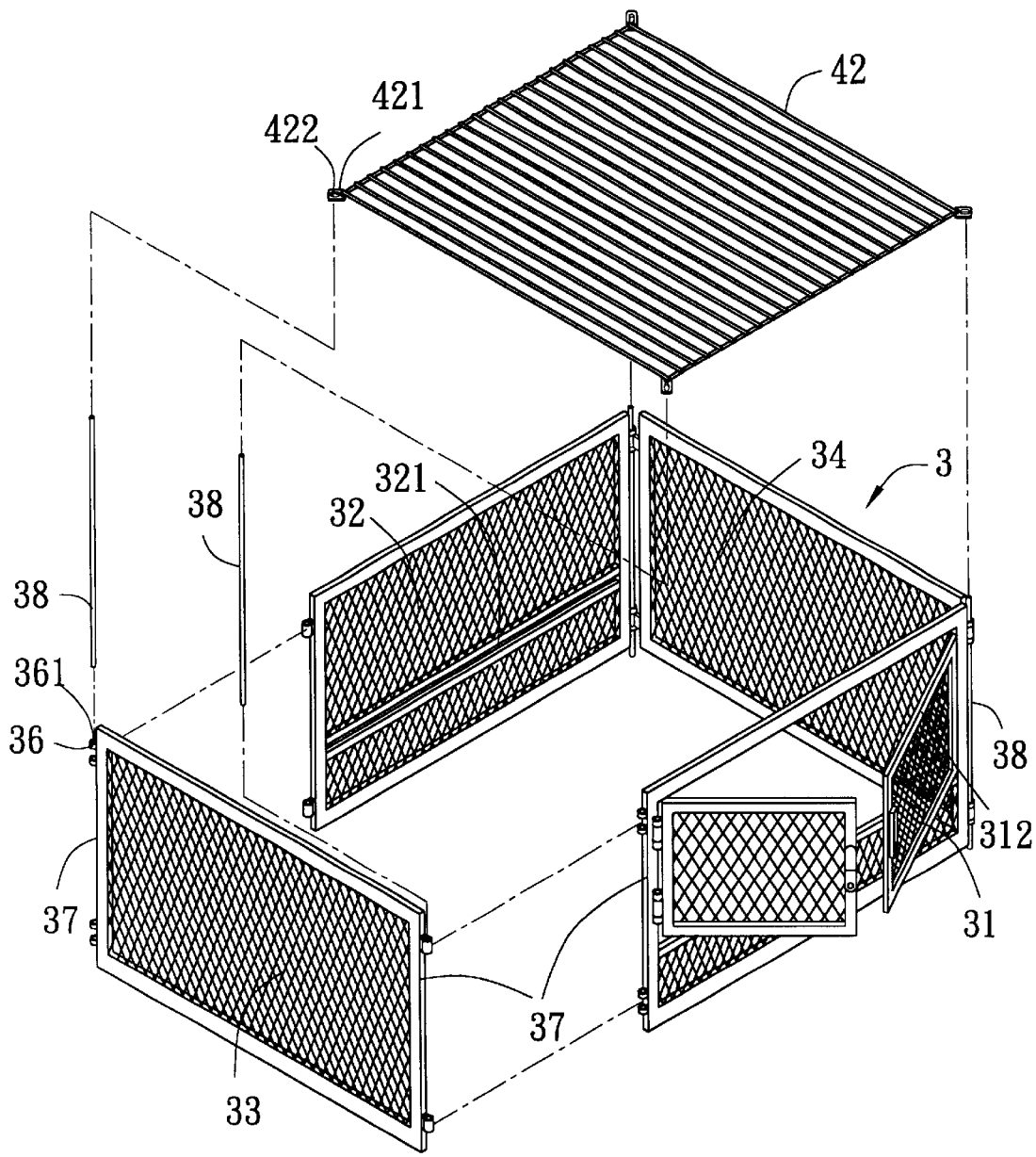
FIG. 5 is an exploded perspective view of a perforated surrounding member of the preferred embodiment.

The perforated surrounding member 3 has a lower peripheral end 30 which abuts against the upper peripheral edge 25, an upper peripheral end 39 which is disposed opposite to the lower peripheral end 30 in the longitudinal direction, and an intermediate surrounding portion which is formed as a wire screen and which extends perimetrically in the longitudinal direction between the upper and lower peripheral ends 39,30. In this embodiment, the intermediate surrounding portion includes front and rear walls 31,32 which are spaced apart from each other in a first direction transverse to the longitudinal direction, and right and left walls 33,34 which are spaced apart from each other in a second direction transverse to both the longitudinal and first directions. With reference to FIG. 5, the front and rear walls 31,32 are connected hingedly and detachably to the adjacent right and left walls 33,34 in such a manner that four engaging stems 38 pass through connecting holes 361 of connecting portions 36 that are formed at lateral sides 37 of the walls 31,32,33,34 and extend about axes parallel to the longitudinal direction. The engaging stems 38 are further inserted into the insert holes 251 at lower ends thereof, respectively, so as to secure the perforated surrounding member 3 on the support frame 2. The intermediate surrounding portion confines a roasting space 35 therein which communicates with the upper chamber of the accommodating space 22. The front wall 31 is formed with an inner peripheral portion which defines an access hole 313 for access of foodstuffs to the roasting space 35. A pair of perforated doors 312 are mounted hingedly on the inner peripheral portion of the front wall 31 about axes parallel to the longitudinal direction so as to close and open the access hole 313. In addition, a pair of engaging racks 311,321 are disposed on inner wall surfaces of the front and rear walls 31,32 respectively and are aligned with each other in the first transverse direction such that a second grill member 41 is mounted in the roasting space 35 and engages the engaging racks 311,321 for placing foodstuffs thereon. A third grill member 42 has four holes 422 at four corners 421 thereof to engage upper ends of the engaging stems 38 so as to dispose the third grill member 42 on the upper peripheral end 39 of the perforated surrounding member 3 for placing foodstuffs thereon.

The upper peripheral end 39 of the perforated surrounding member 3 includes front, rear, right and left parts 391,392, 393,394 which correspond to the front, rear, right and left walls 31,32,33,34, respectively. The lid member 5 includes a top wall 51, a tubular wall 52 which extends downwardly from and which is formed integrally with a periphery of the top wall 51, and a lower peripheral edge 54 which is connected to the tubular wall 52 opposite to the top wall 51. The lid member 5 is mounted hingedly at the rear part 392 of the perforated surrounding member 3 about an axis parallel to the second direction such that the lower peripheral edge 54 can abut against the upper peripheral end 39 to cover the roasting space 35. The lid member 5 cooperates with the third grill member 42 to define a cooking space 53. In addition, a positioning member 56 includes two connecting shafts 561 which have ends that are connected pivotally to each other by a pin 562 extending in the second direction, and opposite ends that are connected to the tubular wall 52 and the left part 394 so as to position the lid member 5 at an angle relative to the upper peripheral end 39. A handle 55 is mounted on the tubular wall 52.

As illustrated, foodstuffs can be placed on the second grill member 41 for roasting, or on the third grill member 42 for cooking in another cooking way by covering the lid member 5. In addition, the portable brazier can serve as a heater and can offer protection to the user by virtue of the perforated surrounding member 3. Moreover, the perforated surrounding member 3 is detachable from the support frame 2 and is foldable so as to facilitate storage and transport of the portable brazier.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A portable brazier comprising:
    a support frame including a base wall, a surrounding wall extending upwardly from a periphery of said base wall to confine an accommodating space for accommodating a source of heat, and a leg member extending downwardly from said base wall, said surrounding wall having an upper peripheral edge distal to said leg member in a longitudinal direction;
    a first grill member fitted to an inner wall surface of said surrounding wall and dividing said accommodating space into upper and lower chambers;
    a perforated surrounding member confining a roasting space therein, and having a lower peripheral end abutting against said upper peripheral edge so as to communicate said roasting space with said upper chamber, an upper peripheral end disposed opposite to said lower peripheral end in the longitudinal direction, and an intermediate surrounding portion that is perforated and that extends perimetrically in the longitudinal direction between said upper and lower peripheral ends, said intermediate surrounding portion defining an access hole to provide access to said roasting space; and
    a lid member mounted on said perforated surrounding member, and having a lower peripheral edge which abuts against said upper peripheral end of said perforated surrounding wall to cover said roasting space.

2. The portable brazier as claimed in claim 1, wherein said intermediate surrounding portion includes front and rear walls spaced apart from each other in a first direction transverse to the longitudinal direction, and right and left walls interconnecting said front and rear walls and spaced apart from each other in a second direction transverse to both the longitudinal and first directions, said access hole being formed in said front wall.

3. The portable brazier as claimed in claim 2, wherein said front and rear walls are connected hingedly to adjacent ones of said right and left walls about axes parallel to the longitudinal direction.

4. The portable brazier as claimed in claim 2, wherein said intermediate surrounding portion further has a pair of engaging racks disposed on inner wall surfaces of said front and rear walls respectively and aligned with each other in the first transverse direction, said portable brazier further comprising a second grill member mounted in said roasting space and engaging said engaging racks for placing foodstuffs thereon.

5. The portable brazier as claimed in claim 4, wherein said lid member further a, top wall, and a tubular wall extending downwardly from and formed integrally with a periphery of said top wall and connected to said lower peripheral edge opposite to said top wall, said portable brazier further comprising a third grill member engaging said upper peripheral end so as to cooperate with said lid member to define a cooking space.

6. The portable brazier as claimed in claim 2, wherein said intermediate surrounding portion is formed as a wire screen.

7. The portable brazier as claimed in claim 2, wherein said front wall has an inner peripheral portion defining said access hole, and a pair of perforated doors mounted hingedly on said inner peripheral portion about an axis parallel to the longitudinal direction so as to close and open said access hole.

8. The portable brazier as claimed in claim 2, wherein said lower peripheral end of said perforated surrounding member is detachably mounted on said upper peripheral edge of said support frame.

9. The portable brazier as claimed in claim 8, wherein said upper peripheral edge is formed with a plurality of insert holes, said lower peripheral end of said perforated surrounding member being provided with a plurality of engaging stems that extend in the longitudinal direction and that are respectively inserted into said insert holes when said lower peripheral end is mounted on said upper peripheral edge.

10. The portable brazier as claimed in claim 2, wherein said upper peripheral end of said perforated surrounding member includes front, rear, right and left parts corresponding to said front, rear, right and left walls respectively, said lower peripheral edge of said lid member being mounted hingedly on said rear part of said upper peripheral end of said perforated surrounding member about an axis parallel to the second direction.

11. The portable brazier as claimed in claim 10, further comprising a positioning member disposed between said left part of said upper peripheral end and said lid member so as to position said lid member at an angle relative to said upper peripheral end.

12. The portable brazier as claimed in claim 1, wherein said lid member is provided with a handle.

13. The portable brazier as claimed in claim 1, wherein said surrounding wall of said support frame is provided with a pair of handles.

* * * * *